United States Patent
Trentadue

(10) Patent No.: US 9,739,391 B2
(45) Date of Patent: Aug. 22, 2017

(54) CHECK VALVE FOR A PIPE SECTION

(75) Inventor: Frederick Trentadue, Olathe, KS (US)

(73) Assignee: Smith & Loveless, Inc., Lenexa, KS (US)

( * ) Notice: Subject to any disclaimer, the term of this patent is extended or adjusted under 35 U.S.C. 154(b) by 748 days.

(21) Appl. No.: 12/985,668

(22) Filed: Jan. 6, 2011

(65) Prior Publication Data

US 2012/0175002 A1 Jul. 12, 2012

(51) Int. Cl.
*F16K 15/03* (2006.01)
*F16K 27/02* (2006.01)
*F16L 23/00* (2006.01)

(52) U.S. Cl.
CPC ........ *F16K 27/0227* (2013.01); *F16K 15/033* (2013.01); *F16L 23/006* (2013.01); *Y10T 137/7837* (2015.04)

(58) Field of Classification Search
CPC ............. Y10T 137/7898; Y10T 137/79; F16K 27/0209; F16K 15/033; F16K 27/0227
USPC ............... 137/527, 527.2; 251/177, 303, 337
See application file for complete search history.

(56) References Cited

U.S. PATENT DOCUMENTS

| | | | |
|---|---|---|---|
| 1,505,958 A | | 8/1924 | Huntting |
| 1,647,036 A | * | 10/1927 | Dileo ............................ 251/298 |
| 2,001,941 A | | 5/1935 | Rowe et al. |
| 3,509,908 A | * | 5/1970 | Holbert, Jr et al. .......... 137/527 |
| 3,937,441 A | * | 2/1976 | Baumann ...................... 251/298 |
| 4,259,983 A | * | 4/1981 | Kessel .......................... 137/512 |
| 4,519,579 A | * | 5/1985 | Brestel et al. ................ 251/172 |
| 5,056,548 A | * | 10/1991 | Mills .......................... 137/15.18 |
| 5,113,899 A | * | 5/1992 | Yonezawa ..................... 137/461 |
| 5,709,240 A | * | 1/1998 | Martin et al. .............. 137/527.2 |
| 6,050,294 A | * | 4/2000 | Makowan ..................... 137/527 |
| 6,247,489 B1 | | 6/2001 | Maskell et al. |
| 6,533,243 B1 | * | 3/2003 | Sumner et al. ............... 251/313 |
| 6,679,290 B2 | * | 1/2004 | Matthews et al. ......... 137/527.2 |
| 7,686,031 B2 | * | 3/2010 | German et al. ............... 137/300 |

(Continued)

FOREIGN PATENT DOCUMENTS

DE 7604601 U1 8/1977

OTHER PUBLICATIONS

Drawing of Smith & Loveless "Check Valve—Spring Loaded Arm FL/FL", Sep. 2008 (1 page).

(Continued)

*Primary Examiner* — Matthew W Jellett
(74) *Attorney, Agent, or Firm* — Wood, Phillips, Katz, Clark & Mortimer

(57) ABSTRACT

A check valve between two pipe segments including a valve body and a valve housing. The valve body includes a valve opening through one face with a valve seat therearound, and a wall extending between the faces defining a part of the circumference of the fluid line between the pipe segment ends with a radial opening in the other part of the fluid line circumference having no wall. The valve housing is removably securable over the radial opening whereby the valve body wall and the valve housing together define a closed circumference of the fluid line between the pipe segments. A valve flapper is secured to the valve housing and pivotally biased relative to the valve housing toward closing against the valve seat, whereby the valve flapper is removable through the valve body radial opening when the valve housing is removed from the valve body.

16 Claims, 4 Drawing Sheets

(56) References Cited

U.S. PATENT DOCUMENTS

| | | |
|---|---|---|
| 2002/0104567 A1* | 8/2002 | Matthews et al. ......... 137/527.2 |
| 2005/0163640 A1 | 7/2005 | Sieben |
| 2007/0114290 A1 | 5/2007 | Kempf et al. |
| 2009/0211655 A1 | 8/2009 | Sisk |
| 2010/0132806 A1 | 6/2010 | Burczynski |
| 2010/0313972 A1* | 12/2010 | Paulin et al. .............. 137/527.2 |

OTHER PUBLICATIONS

Drawing of Smith & Loveless "4 S&L Check Valve Parts", May 2004 (1 page).
Drawing of Smith & Loveless "4 Check Valve Assembly", Aug. 2003 (1 page).
International Search Report dated May 3, 2012.
European Search Report dated Jan. 9, 2017.

\* cited by examiner

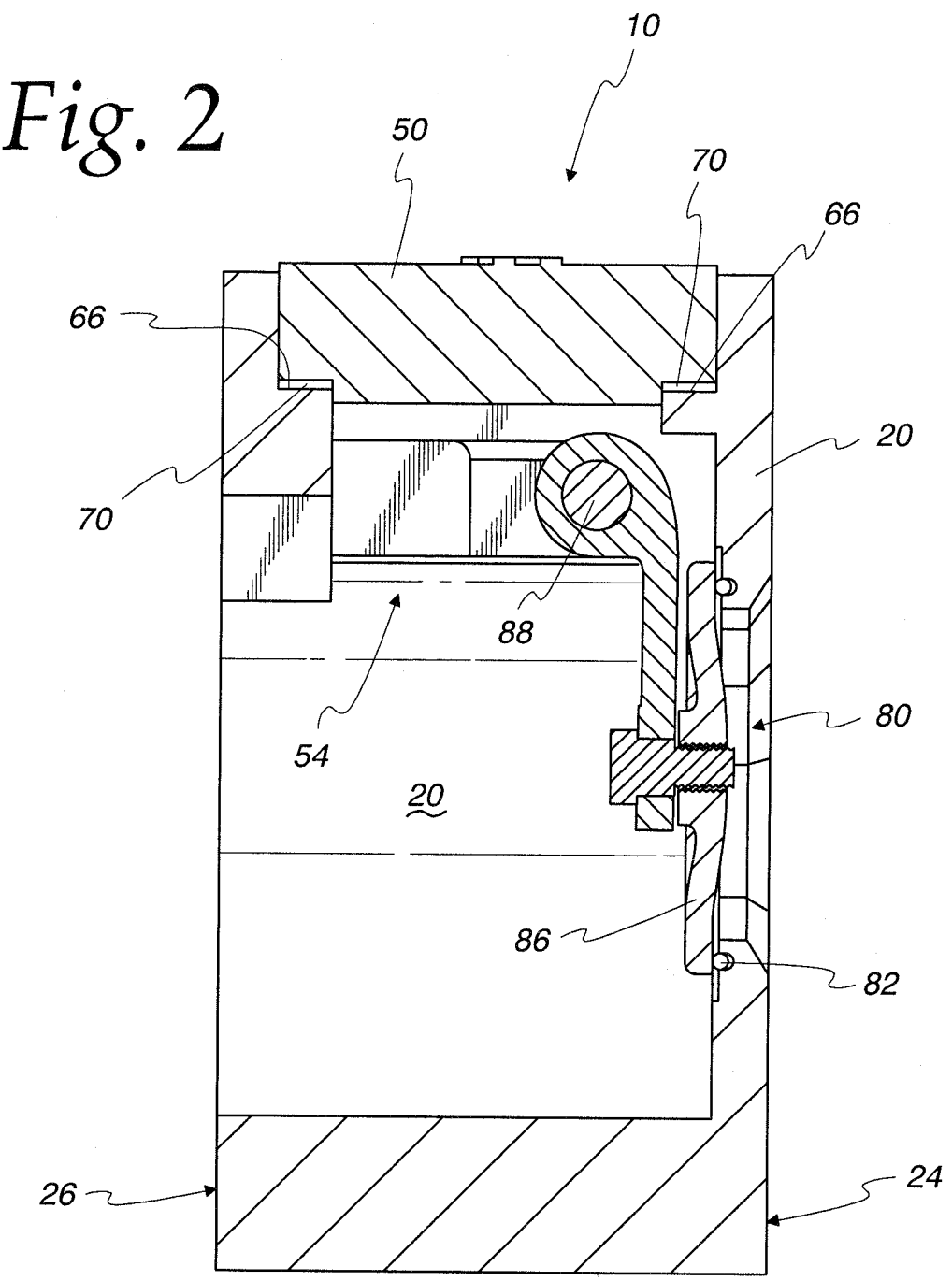

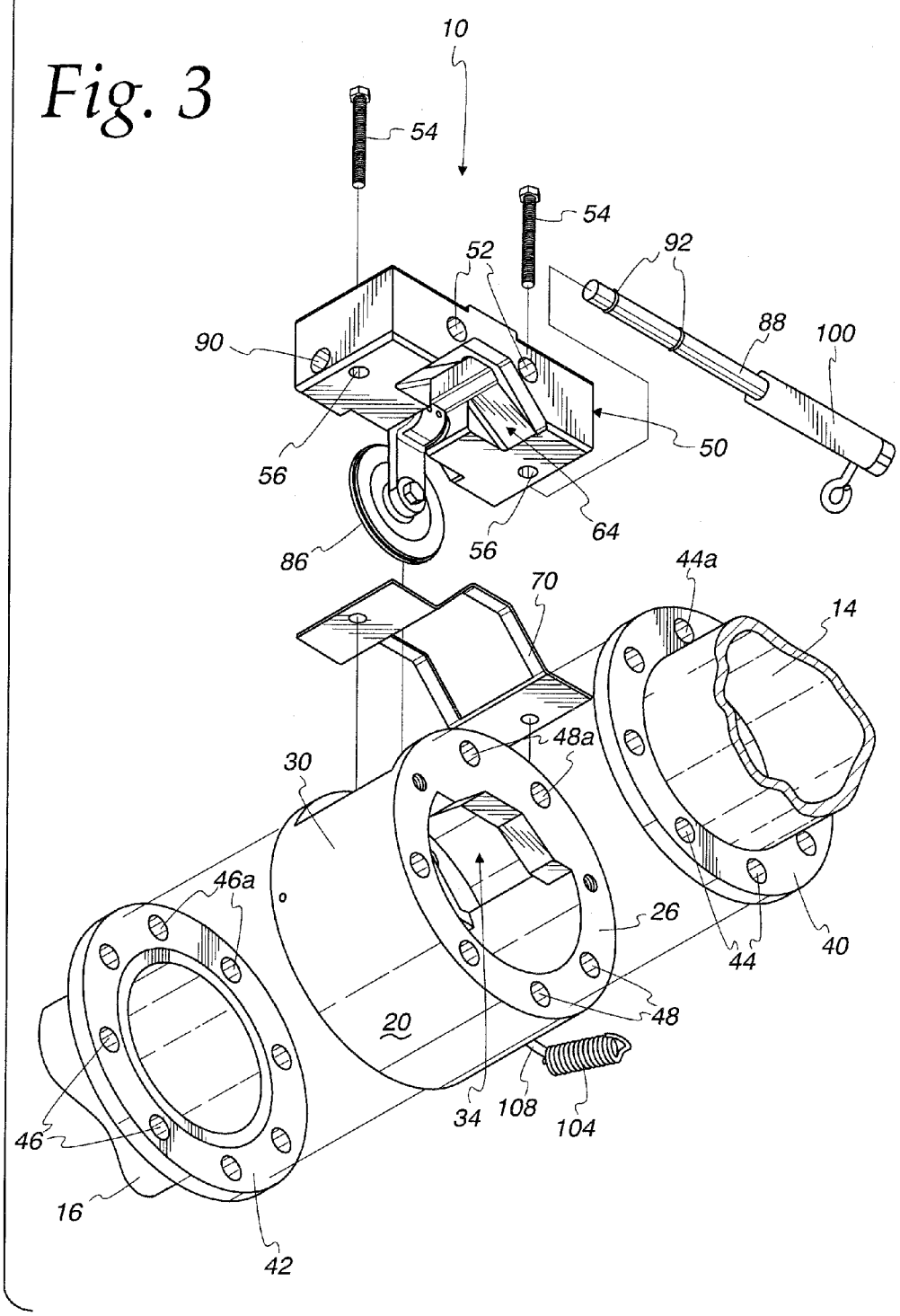

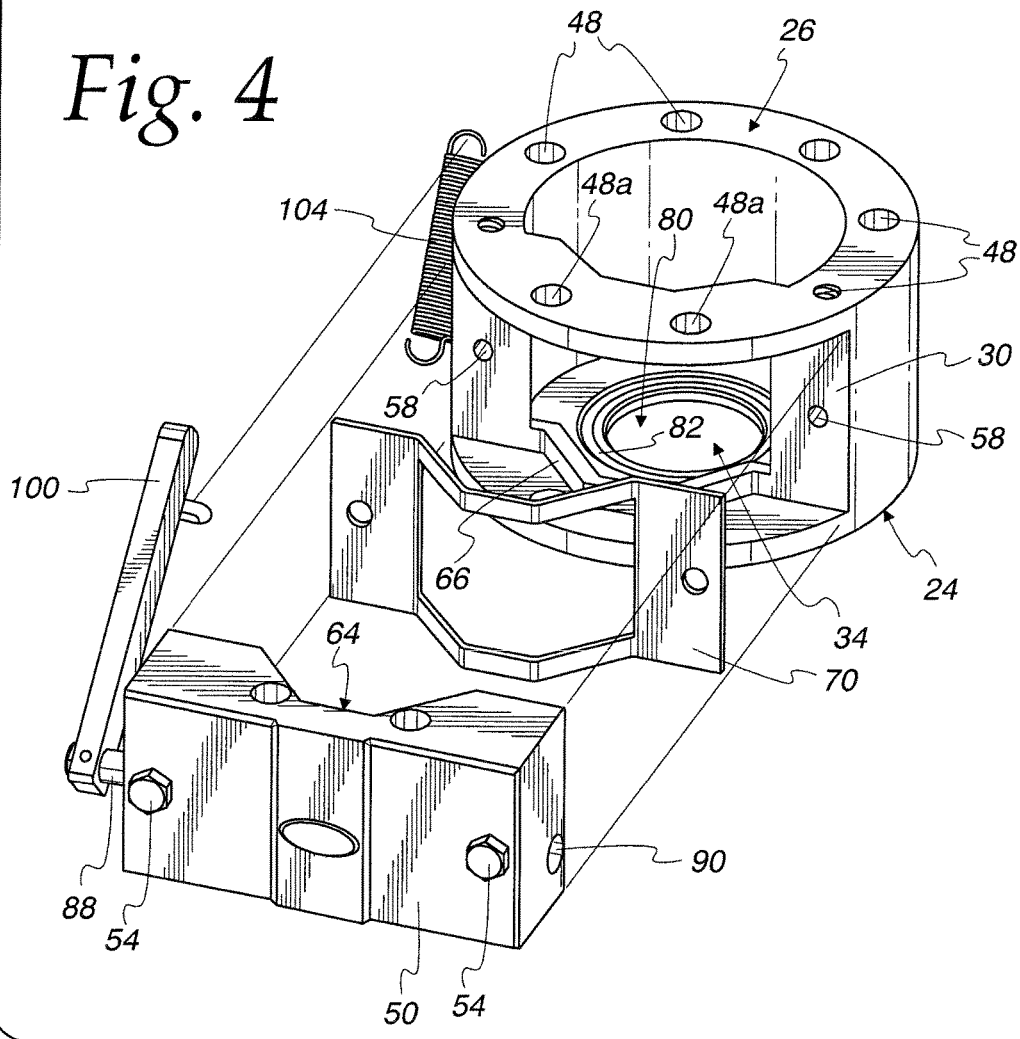

CHECK VALVE FOR A PIPE SECTION

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to a check valve, particularly for use in a pipeline.

BACKGROUND OF THE INVENTION

Pipe systems frequently use check valves which are biased to a closed position unless they are opened by a force sufficient to overcome the force biasing a flapper valve into its closed position. In larger pipe sizes, in particular, the installation and maintenance of such check valves can be difficult, due to the cost of components as well as their size and related difficulties in handling and/or accessing the components.

One valve which has previously been used in such installations is a thin, short length valve that fits between pipe flanges, called a wafer check valve. Another valve which has been used is a standard check valve with a flange on both ends which are secured to the pipe flanges.

Wafer check valves have the advantage of being relatively short in axial length (e.g., between two and three inches), but require that they be removed from the pipeline for service and maintenance. Such removal is not only difficult and time consuming, but then replacing a valve in the gap between pipe segments can be difficult and time consuming as well (e.g., the pipe segments might move when an old valve is removed and then be difficult to align when putting another valve between them).

Standard check valves have in some instances included service ports on their side, which allow access into the valve for service and maintenance without removing the body of the valve from between the pipe segments. However, in order to allow such access, such valve must be substantially bigger (e.g., twelve inches long) so that the service port is large enough for the maintenance worker to be able to reach inside and do the required work (e.g., to replace parts or to remove debris). This much larger valve thus costs more, and still can make repair work clumsy for a worker reaching inside a one foot wide opening.

The present invention is directed toward overcoming one or more of the problems set forth above.

SUMMARY OF THE INVENTION

In one aspect of the present invention, a check valve is provided which is locatable between adjacent ends of two pipe segments of a fluid line, the check valve including a valve body and a valve housing. The valve body has opposite faces, one of the faces being securable to one pipe segment end and the other of the faces being securable to the other pipe segment end. The body includes a valve opening through one face substantially coaxial with the interior of the pipe segments and including a valve seat around the opening and a wall extending between the faces defining a part of the circumference of the fluid line between the pipe segment ends with a radial opening in the other part of the fluid line circumference having no wall. The valve housing is removably securable over the radial opening of the valve body whereby the valve body wall and the valve housing together define a closed circumference of the fluid line between the valve body opposite faces. A valve flapper is secured to the valve housing and pivotally biased relative to the valve housing toward closing against the valve seat, whereby the valve flapper is removable through the valve body radial opening when the valve housing is removed from the valve body.

In one form of this aspect of the present invention, the valve body faces are minimally spaced apart in the axial direction to allow the valve flapper to be removed from the valve body with the valve housing.

In one form of this aspect of the present invention, the valve body faces are minimally spaced apart in the axial direction to allow the valve flapper to be removed from the valve body with the valve housing.

In another form of this aspect of the present invention, a pivot shaft has the valve flapper secured thereto, and extends through a transverse opening through the valve housing, with one end of the pivot shaft projecting from the housing and including a radially extending arm biasing the arm toward pivoting the pivot shaft toward closing the valve flapper on the valve seat. In one further form, a spring pivotally biases the arm and is selectively detachable from the arm for removal of the housing from the valve body. In another further form, O-rings are on opposite sides of the pivot shaft, and in a still further form a gasket is between the valve body and the valve housing.

In yet another form of this aspect of the present invention, a pair of bolts removably secure the valve housing to the valve body, with the bolts extending through openings in opposite sides of the valve housing and securable in openings on opposite sides of the valve body wall. In a further form, the bolt openings are substantially parallel to one another, and in a still further form the wall is generally cylindrical and the bolt openings are substantially parallel to lines tangential to the cylindrical walls.

In another form of this aspect of the present invention, the radial opening includes a generally radially outwardly facing shoulder therearound against which the valve housing is securable with a gasket therebetween.

In another aspect of the present invention, a pipe section with controlled flow is provided, including two pipe segments of a fluid line and a check valve according to the first aspect of the invention and its various forms between adjacent ends of the two pipe segments.

Other objects, features, and advantages of the invention will become apparent from a review of the entire specification, including the appended claims and drawings.

BRIEF DESCRIPTION OF THE DRAWINGS

FIG. 2 is a vertical cross-sectional view of the check valve of FIG. 1;

FIG. 3 is an exploded perspective view of the FIG. 1 check valve in association with pipe segments of a pipeline; and FIG. 4 is an exploded perspective view of the FIG. 1 check valve, showing the top of the check valve.

DETAILED DESCRIPTION OF THE PREFERRED EMBODIMENT

Figure 1:
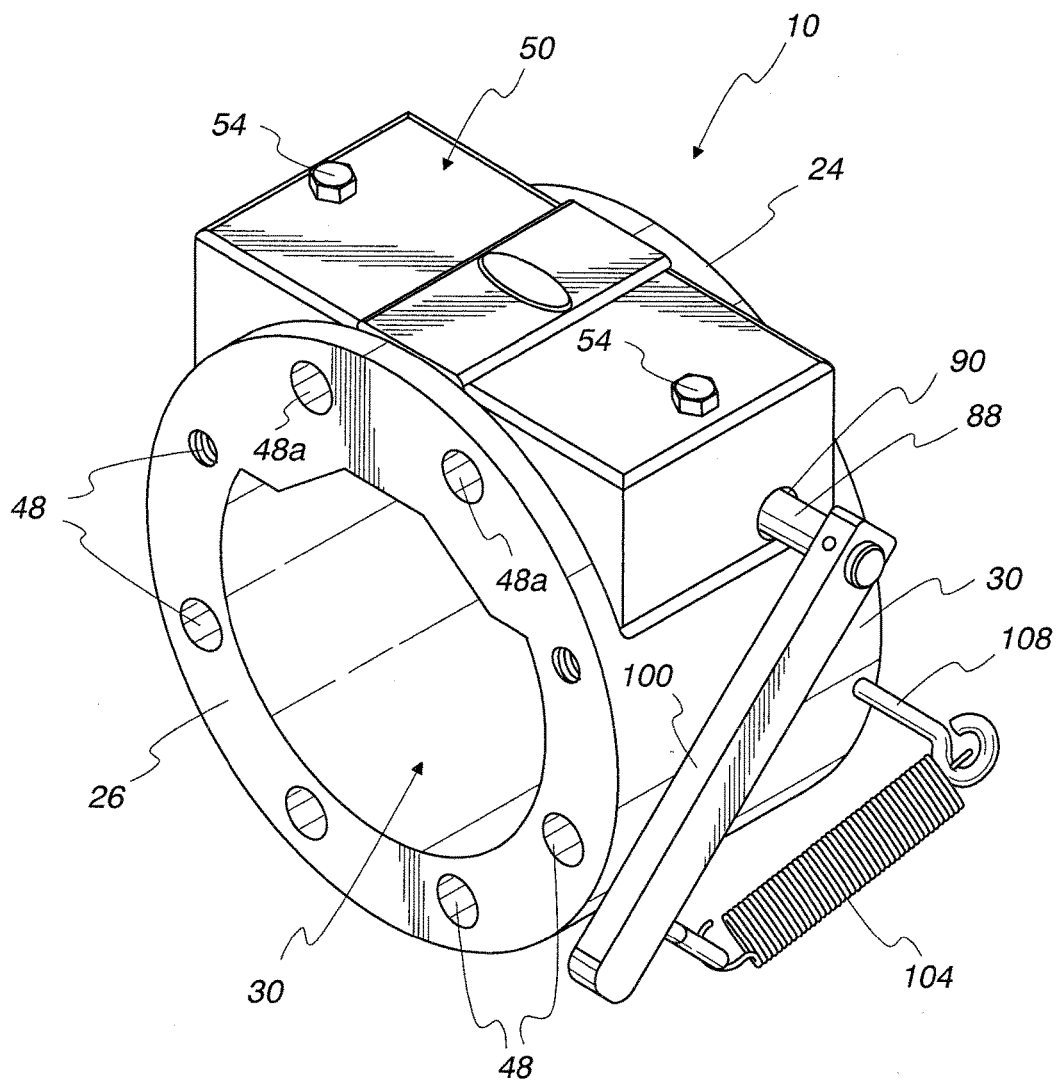
FIG. 1 is a perspective view of a check valve according to the present invention.

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus operating in accordance with this invention is described in the normal (upright) operating position, and terms such as upper, lower, horizontal, etc., are used with reference to this position.

The apparatus of this invention can have certain conventional components and control mechanisms the details of which, although not fully illustrated or described, will be apparent to those having skill in the art and an understanding of the necessary functions of such components and mechanisms.

Some of the Figures illustrating the preferred embodiment of the apparatus of the present invention show conventional structural details and mechanical elements or components that will be recognized by one skilled in the art. However, the detailed descriptions of such elements are not necessary to an understanding of the invention, and accordingly, are herein presented only to the degree necessary to facilitate an understanding of the novel features of the present invention.

A check valve 10 mountable between adjacent ends of two pipe segments 14, 16 (see FIG. 3) of a fluid line according to the present invention is shown in the Figures.

The check valve 10 includes a valve body 20 having opposite faces 24, 26 which may be secured to adjacent ends of the pipe segments 14, 16 as described in greater detail hereafter. As will be apparent with a full understanding of the present invention, these faces 24, 26 may be spaced apart a minimal distance (e.g., four inches), allowing for a very compact check valve 10 which nevertheless may be easily accessed for servicing and maintenance without requiring removal of the valve 10 from the pipe segments 14, 16.

A wall 30 extends between the valve body faces 24, 26, defining a part of the circumference of the fluid line between the pipe segments 14, 16. The wall 30 is generally cylindrical but does not extend fully therearound so as to define a radial opening 34 on one side of the valve body 20.

The pipe segments 14, 16 each include a radial flange 40, 42 having a set of aligned bolt holes 44, 46 therethrough. The wall 30 has a radial thickness substantially the same as the radial dimension of the pipe segment flanges 40, 42, and also includes a set of aligned bolt holes 48 therethrough. Bolts (not shown) or other suitable fasteners may be extended through the holes 44 in one flange 40, through the holes 48 in the valve body wall 30, and through the holes 46 in the other flange 42, and secured therein by suitable fasteners such as nuts (not shown).

It should be appreciated that the valve body 20 may thus be securely mounted between pipe segments 14, 16. Moreover, while the valve body 20 could be removed, as described in greater detail hereafter such removal will not thereafter be necessary during servicing and maintenance of the valve 10.

A valve housing 50 is removably securable over the radial opening 34 of the valve body 20. Two of the bolts extending between the pipe segment flanges 40, 42 (through bolt holes 44a, 46a, 48a) also extend through axially oriented openings 52 in the housing 50. Further, a pair of bolts 54 may be inserted through two openings 56 in opposite sides of the valve housing 50 and secured in aligned openings 58 on opposite sides of the valve body wall 30, with the openings 56, 58 on opposite sides substantially parallel to one another. Further, the wall 30 may advantageously be generally cylindrical with the bolt openings 56, 58 substantially parallel to lines tangential to the cylindrical walls 30.

It should be appreciated, of course, that the number, type and size of bolts and associated openings could be different than shown with the illustrated embodiment, depending, for example, on the size of the components. It should be similarly appreciated that different fastening devices could be advantageously to removably secure the valve housing 50 to the pipe segments 14, 16 while obtaining the advantages of the present invention.

The valve housing 50 is generally boxed shaped, but includes a center recessed portion 64 substantially matching raised lips 66 on the sides of the radial opening 34. A suitable gasket 70 is also provided between the valve body 20 and the valve housing 50 to close off leaks between the body 20 and housing 50, whereby the valve body wall 30 and the valve housing 50 together define a closed circumference of the fluid line between the valve body opposite faces 24, 26.

A valve opening 80 extends through one valve body face 24 substantially coaxial with the interior of the pipe segments 14, 16 and includes a valve O-ring seat 82 around the opening 80 which faces opposite face 24.

A valve flapper 86 is secured to a pivot shaft 88 which is pivotally received in transverse pivot openings 90 on opposite sides of the valve housing center recessed portion 64. Suitable seals, such as O-rings 92 (see FIG. 3), may be provided on opposite sides of the pivot shaft 88 to block leakage through the transverse pivot openings 90.

The pivot shaft 88 is suitably biased toward pivoting in a direction so as to seat the valve flapper 86 against the valve O-ring seat 82. In the illustrated embodiment, a pivot arm 100 extends radially from the axial direction of the pivot shaft 88 and is biased by a tension spring 104 which is secured to a mount 108 on the valve body 20, with the spring 104, the arm 100, and the position of the mount 108 selected so that the spring 104 applies tension to seat the flapper 86 on the valve O-ring seat 82 as desired for operation of the check valve 10. The spring 104 is selectively detachable from the arm 100. It should be appreciated, however, that still other actuation structures could be used to bias the flapper 86 including, for example, weights and pneumatic, hydraulic and/or electric drives.

It should be appreciated that the check valve 10 according to the present invention may be easily serviced and maintained by simply removing four bolts (those through openings 52 and 56), disconnecting the spring 104 from either the arm 100 or the mount 108, and then removing the entire valve housing 50, including the valve flapper 86. Suitable repairs, if required, may then be accomplished on parts of the housing 50, flapper 86 and/or pivot arm 100 (including seals 92) as well as replacing the gasket 70. Still further, sufficient access may be gained through the valve body radial opening 34 to clear away debris, or to replace the O-ring seat 82, if necessary. Moreover, all of this may be accomplished while maintaining a rigid pipe section, with the valve body 20 securely connecting the pipe segments 14, 16, so that replacement of the valve housing 50 and flapper 86 may be easily accomplished by fitting it back into the body radial opening 34.

It should thus also be appreciated that the check valve 10 of the present invention can be serviced and maintained without requiring that the entire valve structure be removed, thereby avoiding difficulties in remounting check valves between pipe segment ends. Moreover, this can be accomplished by use of a small valve structure, as the valve body faces may be minimally spaced apart in the axial direction while still allowing easy servicing and maintenance. For example, as used with a 4" IPS size pipe, the check valve 10 may be only about five inches long, as compared to two and a quarter inch wafer check valves (which must be completely removed for service) or thirteen inch full body check valves for comparable applications.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A check valve locatable between adjacent ends of two pipe segments of a fluid line, comprising:
a valve body having opposite faces, one of said faces being securable to one pipe segment end and the other of said faces being securable to the other pipe segment end, said body including
a valve opening through one face substantially coaxial with the interior of said pipe segments and including a valve seat around said opening, said valve seat facing opposite said one face, and
a wall extending between said faces defining a part of the circumference of said fluid line between said pipe segment ends with a radial opening in the other part of the fluid line circumference having no wall;
a valve housing removably securable over the radial opening of said valve body whereby said valve body wall and said valve housing together define a closed circumference of said fluid line between said valve body opposite faces;
a longitudinal pivot shaft having an axis and extending transverse to said fluid line with a portion inside said closed circumference of said fluid line, said pivot shaft being secured to said valve housing for pivoting around said axis with one end of said pivot shaft extending out from said valve housing;
a pivot arm extending radially relative to said axis with one pivot arm end secured to said pivot shaft one end;
a mount secured to said valve body;
a selectively detachable biasing member between the other pivot arm end and said mount, said biasing member biasing said pivot arm toward pivoting said pivot shaft in a first direction; and
a valve flapper secured to said pivot shaft portion wherein biasing said pivot shaft in said first direction biases said valve flapper toward closing against said valve seat.

2. The check valve of claim 1, wherein
said valve opening has raised lips on opposite axial ends; and
said valve housing is box shaped with a center recessed portion substantially matching said radial opening raised lips.

3. The check valve of claim 2, further comprising a gasket between said valve body and said valve housing.

4. The check valve of claim 3, further comprising a pair of bolts for removably securing said valve housing to said valve body, said bolts extending through openings in opposite sides of said valve housing and securable in openings on opposite sides of said valve body wall.

5. The check valve of claim 4, wherein said bolt openings are substantially parallel to one another.

6. The check valve of claim 5, wherein said wall is generally cylindrical and said bolt openings are substantially parallel to lines tangential to said cylindrical walls.

7. The check valve of claim 1, wherein said radial opening includes a generally radially outwardly facing shoulder therearound against which said valve housing is securable with a gasket therebetween.

8. The check valve of claim 1, wherein said flapper valve has a selected diameter and said other part of the fluid line circumference having no wall defines an opening into said fluid line having a dimension transverse to the pipe segment axes which is at least as great as said flapper valve selected diameter.

9. A pipe section with controlled flow, comprising:
two pipe segments of a fluid line;
a check valve between adjacent ends of the two pipe segments, including:
a valve body having opposite faces, one of said faces being securable to one pipe segment end and the other of said faces being securable to the other pipe segment end, said body including
a valve opening through one face substantially coaxial with the interior of said pipe segments and including a valve seat around said opening, said valve seat facing opposite said one face, and
a wall extending between said faces defining a part of the circumference of said fluid line between said pipe segment ends with a radial opening in the other part of the fluid line circumference having no wall;
a valve housing removably securable over the radial opening of said valve body whereby said valve body wall and said valve housing together define a closed circumference of said fluid line between said valve body opposite faces;
a longitudinal pivot shaft having an axis and extending transverse to said fluid line with a portion inside said closed circumference of said fluid line, said pivot shaft being secured to said valve housing for pivoting around said axis with one end of said pivot shaft extending out from said valve housing;
a pivot arm extending radially relative to said axis with one pivot arm end secured to said pivot shaft one end;
a mount secured to said valve body;
a selectively detachable biasing member between the other pivot arm end and said mount, said biasing member biasing said pivot arm toward pivoting said pivot shaft in a first direction; and
a valve flapper secured to said pivot shaft portion wherein biasing said pivot shaft in said first direction biases said valve flapper toward closing against said valve seat.

10. The pipe section of claim 9, wherein said valve body faces are minimally spaced apart in the axial direction to allow said valve flapper to be removed from said valve body with said valve housing.

11. The pipe section of claim 9, further comprising O-rings on opposite sides of said pivot shaft.

12. The pipe section of claim 9, further comprising a pair of bolts for removably securing said valve housing to said valve body, said bolts extending through openings in opposite sides of said valve housing and securable in openings on opposite sides of said valve body wall.

13. The pipe section of claim 12, wherein said bolt openings are substantially parallel to one another.

14. The pipe section of claim 13, wherein said wall is generally cylindrical and said bolt openings are substantially parallel to lines tangential to said cylindrical walls.

15. The pipe section of claim 9, wherein said radial opening includes a generally radially outwardly facing shoulder therearound against which said valve housing is securable with a gasket therebetween.

16. The pipe section of claim 9, wherein said flapper valve has a selected diameter and said other part of the fluid line circumference having no wall defines an opening into said fluid line having a dimension transverse to the pipe segment axes which is at least as great as said flapper valve selected diameter.

\* \* \* \* \*